(12) United States Patent
Publicover et al.

(10) Patent No.: US 10,300,319 B2
(45) Date of Patent: *May 28, 2019

(54) HINGE OR THE LIKE FOR FOLDING REBOUNDER

(71) Applicant: JumpSport, Inc., Saratoga, CA (US)

(72) Inventors: Mark W. Publicover, Saratoga, CA (US); Jon P. Hylbert, Los Gatos, CA (US); Kevin B. Charles, Millbrae, CA (US)

(73) Assignee: JumpSport, Inc., Saratoga, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 15/263,124

(22) Filed: Sep. 12, 2016

(65) Prior Publication Data

US 2017/0095684 A1    Apr. 6, 2017

Related U.S. Application Data

(63) Continuation of application No. 15/163,572, filed on May 24, 2016, now abandoned, which is a
(Continued)

(51) Int. Cl.
*A63B 5/11* (2006.01)
*E05D 3/02* (2006.01)
*F16C 11/04* (2006.01)

(52) U.S. Cl.
CPC .................. *A63B 5/11* (2013.01); *E05D 3/02* (2013.01); *F16C 11/04* (2013.01); *A63B 2210/50* (2013.01); *Y10T 16/5404* (2015.01)

(58) Field of Classification Search
CPC .... A63B 5/00; A63B 5/08; A63B 5/11; A63B 5/12; A63B 6/00; A63B 2210/50; E05D 3/02; Y10T 16/5404
See application file for complete search history.

(56) References Cited

U.S. PATENT DOCUMENTS 609,634 A * 8/1898 Tanner .................. B62K 21/16
74/551.4
663,856 A * 12/1900 Browder .................. A62B 1/22
182/140
(Continued)

FOREIGN PATENT DOCUMENTS

| EP | 1 475 544 A1 | 11/2004 |
| FR | 1278327 | 12/1961 |
| RU | 2000113624 | 4/2012 |

OTHER PUBLICATIONS

World Intellectual Property Organization, International Search Report and Written Opinion, dated Mar. 6, 2013, issued in International Application No. PCT/US2012/065950.

*Primary Examiner* — Garrett K Atkinson
(74) *Attorney, Agent, or Firm* — Klarquist Sparkman, LLP (57) ABSTRACT

A portable exercise system has a foldable perimeter frame comprising at least two elongated frame members that are joined by hinges. The hinges are joined to ends of the frame members, which ends are generally tubular. Each hinge has a cap-like body having an interior surface that defines a cavity configured to nestingly receive one of the ends of the frame members. A deformable plug is located within the central cavity of the one of the ends. A tightening mechanism is operated to expand the plug radially and thereby cause the end to expand radially such the generally tubular outer surface of the end frictionally engages the interior surface of the a cap-like body.

22 Claims, 9 Drawing Sheets

Related U.S. Application Data continuation of application No. 14/359,296, filed as application No. PCT/US2012/065950 on Nov. 19, 2012, now Pat. No. 9,345,919.

(60) Provisional application No. 61/652,130, filed on May 25, 2012, provisional application No. 61/561,815, filed on Nov. 18, 2011.

(56) References Cited

U.S. PATENT DOCUMENTS

| | | | |
|---|---|---|---|
| 1,264,574 A | | 4/1918 | Stuart |
| 2,066,182 A | | 12/1936 | Lenz |
| 2,430,714 A | | 11/1947 | Geer |
| 2,694,587 A | | 11/1954 | Bullough |
| 2,969,124 A | | 1/1961 | Nissen |
| 3,345,092 A | * | 10/1967 | Athman .............. F01N 13/1805 180/89.2 |
| 3,950,758 A | * | 4/1976 | Mirrione ................ H01Q 1/08 343/881 |
| 4,393,541 A | * | 7/1983 | Hujsak ................. B25J 17/0241 16/291 |
| 4,415,151 A | * | 11/1983 | Daniels ..................... A63B 5/11 482/28 |
| 5,251,359 A | | 10/1993 | Finkl |
| 6,237,169 B1 | * | 5/2001 | Ying ........................ A63B 5/11 482/27 |
| 6,510,568 B1 | * | 1/2003 | Drobinski .............. A47D 7/002 5/93.1 |
| 6,565,069 B2 | | 5/2003 | Morris |
| 7,003,849 B2 | * | 2/2006 | Cohen ................. A63C 11/221 16/232 |
| 7,468,020 B2 | * | 12/2008 | Lai ........................... A63B 5/11 16/324 |
| 8,006,345 B1 | | 8/2011 | Bryce |
| 2005/0130804 A1 | | 6/2005 | Hall |
| 2007/0240918 A1 | | 10/2007 | Edelblut |
| 2008/0009394 A1 | | 1/2008 | Vanelverdinghe et al. |
| 2008/0090704 A1 | | 4/2008 | Denis et al. |
| 2010/0242855 A1 | | 9/2010 | Farmer et al. |

* cited by examiner

HINGE OR THE LIKE FOR FOLDING REBOUNDER

CROSS REFERENCE TO RELATED APPLICATIONS

This is a continuation of application Ser. No. 15/163,572, filed May 24, 2016, which is a continuation of application Ser. No. 14/359,296, filed May 19, 2014, now U.S. Pat. No. 9,345,919, which is the U.S. National Stage of International Application No. PCT/US2012/065950, filed Nov. 19, 2012, which claims the benefit of U.S. Provisional application Ser. No. 61/652,130, filed May 25, 2012, and U.S. Provisional application Ser. No. 61/561,815, filed Nov. 18, 2011, all of which are incorporated herein by reference in their entirety.

FIELD

This invention relates to small trampoline-type devices for physical exercise.

BACKGROUND AND SUMMARY

Small trampoline-type devices for physical exercise, commonly referred to as "rebounders," typically have a frame that is circular, but may have a frame that is square, rectangular, oval, or of any number of various shapes. Such devices have a relatively small diameter of about 54 inches or less for a circular frame with the frame encompassing an area of about 2,300 square inches or less. Larger trampolines of a diameter of 60 inches or less sometimes are used for rebounding exercises. But a frame of 54 inches or less will be the more common usage. Such devices have a relatively small diameter surface area available for jumping of about 1,200 square inches or less, but could be 2,000 square inches or about equal to the frame area by using an atypical rebounder design. An example of a common rebounder device is shown in U.S. Pat. No. 7,094,181. The instant invention is particularly well suited for a trampoline large enough for a single adult sized user generally weighing less than 375 lbs.

Such devices, like larger trampolines, have a bed that is made of flexible fabric attached to a frame by spring elements such as elastic cords or coil springs. Legs support the frame at a distance above the ground. The trampoline may be square, rectangular, circular or oval, or any number of various polygonal or other shapes. The frame may be made of one of several materials, such as metals like steel, aluminum, or other alloy; or, molded plastics, composite, or other similar materials. Disclosed herein are trampoline-type devices that are large enough to support a single user, but not large enough to safely or functionally support two adult users. The device includes a perimeter frame that extends generally in a horizontal plane during use for exercising. The perimeter frame is supported above a floor surface by plural legs or other generally vertically extending structure.

Disclosed herein is a new hinge arrangement wherein a molded hinge component permits the device to be folded for easier transport or storage of the trampoline. Described is an innovative over-molded hinge unit to connect rail segments of a foldable trampoline. The over-molded hinge can be made of various materials such as cast metal, which is still unique when compared to current methods. However, for foldable trampolines, plastic or similar material is preferred for the hinge unit. Prior systems do not use the method of over-molding and completely surrounding the rail of the trampoline frame in such a manner as to allow the hinge to be installed on the rail ends without the need of a pin-like fastener or weld to hold the hinge in place on the frame, when stationary, or when it is being folded and unfolded.

A hinge device is shown which creates increased pressure and friction so that the hinge is much stronger than prior hinges and less likely to slip or move once engaged. This is the case even though the hinge device and its parts are not part of the metal frame sections, but connected after the rail of the rebounder or mini-trampoline has been fabricated. Additionally, the described connection is accomplished without the current and previous designs which require welding the metal hinge segments as an integrated part of the rail portions in order to connect them for a foldable trampoline. Traditional hinge designs are a result of the belief that welding metal and parts together was the only viable and cost effective way to ensure a hinge capable of withstanding the relatively extreme vertical forces that are exerted on a trampoline supported by a horizontally disposed hinge at a break between frame sections.

Also disclosed are several versions of the presently described hinge device, including, but not limited to, various plug frame devices that substantially increase the hinge's ability to withstand the severe stresses and force placed on this hinge when a full sized adult is jumping on the foldable trampoline device.

DETAILED DESCRIPTION

Disclosed herein is a trampoline-type device having a hinged perimeter frame arrangement. The described trampoline-type device has a frame with a diameter less than 60 inches, for a circular frame, more commonly 54 inches or less, that is large enough to properly support a single user or jumper, but not large enough to properly support two adult sized users. Such device is supported by plural legs, with the frame able to fold in order to facilitate storage and transport. The legs may be removed in many ways and are not the subject of the instant disclosure. Folding rebounders have been available in the market for some time. However, the system disclosed herein has several advantages over prior rebounder systems.

One advantage of the currently described system is its innovative method of using an over-molded hinge unit to connect frame rail pieces on a folding trampoline. Prior systems do not use the method of over-molding and completely surrounding the rail of the trampoline frame in such a manner as to allow the hinge to be installed on the rail ends without the need of a pin-like fastener or weld to hold the hinge in place when it is being folded and unfolded. Of course, one or both sides of the hinge can be pinned or fasten to the rails, but the hinge unit is designed so that it could function over and over again without being fastened or bolted to the rebounder rails. The hinge unit can have holes or slots through its body that expose portions of the rail ends and yet the unit still surrounds the rail ends. Each hinge side could be cut in half from top to bottom in line with the rail or otherwise, and then those halves could be pinned or bolted or slide locked together to surround or even clamp onto the rail ends. This would allow the same hinge unit to fit on slightly different rail diameters, yet it would still substantially surround the rail ends without needing to be pinned or welded to the rail ends in order to function over and over again without coming off.

In one arrangement, rail ends are covered or capped by each side of the hinge so that they cannot touch when the trampoline is unfolded and ready to use, in another arrangement, the hinge sides are open ended such that the rail ends can contact or compress against each other when the trampoline is unfolded.

Prior systems have used metal hinges for metal rail pieces. These metal hinge units are generally welded or bolted with metal bolts onto metal framing. It previously has been assumed that "like must be connected to like" concerning materials used to join a foldable frame means that the hinge material is determined to match the frame material. Thus, the current thinking regarding trampoline manufacture is that a metal frame requires a metal hinge; and a plastic frame might use a plastic hinge structure. An example of a plastic frame and hinge design is described in U.S. Pat. No. 7,018,322 (Carter). Carter describes a plastic frame segments that end in integrated hinges that are extensions of the frame segment itself. So, the hinges are made of a molded material because they are part of the molded frame segment itself. Carter does not suggest a metal hinge for his system because the frame material used is molded plastic. Carter also does not suggest using a metal or molded hinge cap covering the rail ends.

When molded plastic frames are made, there is no concern of misalignment, as the molded hinges match perfectly with each other. In contrast, rolled metal frame rails require some bending and reshaping after their production, precisely because they are not molded, but actually rolled in large coils that must be cut and re-bent or reformed. For these reasons, prior folding rebounders have not utilized molded hinges to cover and connect the ends of the metal frame segments.

An entirely new welded hinge was created for a folding rebounder where the frame rail halves are in contact with each other when the trampoline is in the open position (not shown). Further development resulted in the creation of the new molded hinge system described herein (FIGS. 1-14F).

The use of a molded hinge in conjunction with a metal part is new for use with folding trampolines. More significantly, by configuring the herein described molded hinge unit so that it is adaptable to any material rail, the presently described system "caps" or overlaps the ends of the rail pieces, permitting it to be more adaptable to any kind of rail shape. Thus, a molded hinge could be made to adapt to a rail possessing 90 degree edges, or could adapt to a rail formed in other shapes. The hinge would only need to be molded to match whatever shape the rail possesses. The result is a part that is much easier to make and less likely to fit improperly after fabrication. This reduces production costs and ensures a better working product, with similar strength and durability as that achieved by the typical welded hinge.

The presently disclosed system dispenses with the limitation of welding hinges to a folding trampoline to great benefit. Here, a molded hinge unit is used to connect metal frame segments. Although the variance can be minor, using welded metal compensates for the slight misalignment of the frame segments to be joined, by attaching the frame segments via welded metal hinges that are equal in strength and material to the frame itself.

Also, while the instant disclosure describes a new molded hinge applied to a metal rail, it is readily apparent that a molded hinge may also be attached to framing material that is not metal. For example, the hinge described herein may be attached to other frame materials including composite materials, fiberglass, Kevlar, and other materials for molded frame segments.

Figure 1:
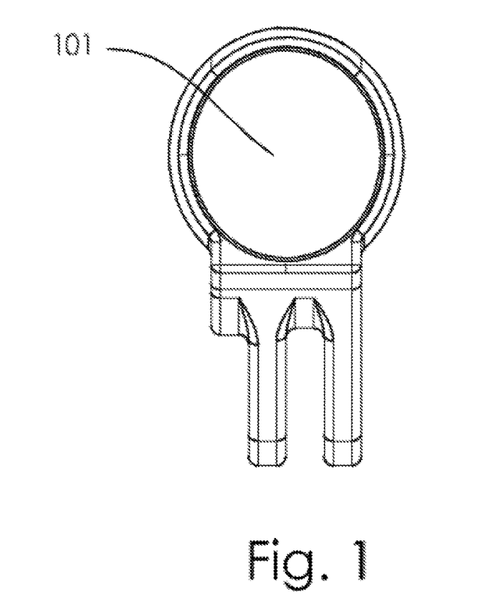
FIG. 1 is a rear view of the oval frame hinge half which attaches to a rail end segment.

FIG. 1 is a front view of a hinge half or hinge member having a cap-like body with an interior surface that defines a cavity 101 configured to nestingly receive an end of an elongated frame member. The cavity is surrounded by a generally cylindrical interior wall surface that has an oval cross-section, e.g. a surface that is an ovid cylinder. There are two fingers on the hinge which interlock when joined with another hinge half. The interlocking fingers have flat surfaces that face each other when two hinge halves are assembled together in the manner of a finger joint, so as to resist slippage or twisting due to forces being exerted by an individual jumping on the trampoline. Although a generally oval cross-sectional shape is shown, it should be readily apparent that other shapes may be utilized, so long as they are not substantially round. It is disadvantageous for a hinge, for use in trampolines, to have a socket-type rail receptacle with a cavity defined by a surface with a round cross-section because a cylindrical surface with a round cross-section could allow the hinge device to spin on an axis around the end of a rail section received in the socket. The socket wall and the outer surface of the rail end received within the socket should be closely spaced and should have non-circular cross-sections that generally conform to one another, so as to inhibit rotation of the rail end within the socket.

Figure 2:
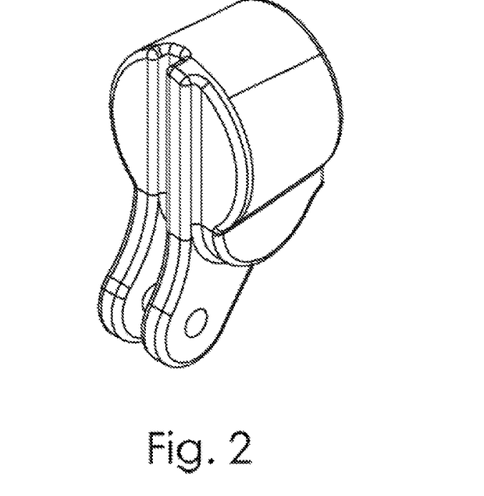
FIG. 2 is an isometric view of a substantially oval frame hinge half.
Figure 5:
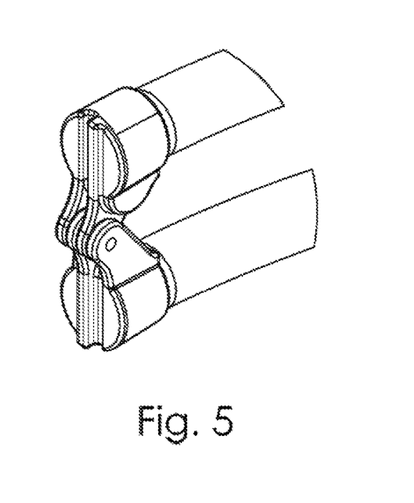
FIG. 5 is a close up view of the frame hinge assembly in the folded position.
Figure 6:
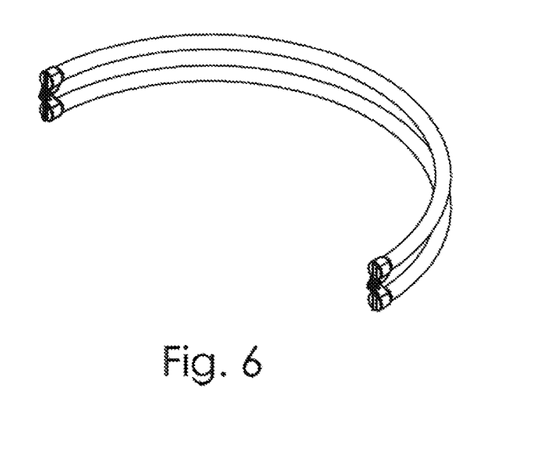
FIG. 6 is an isometric view of the full folding frame assembly in the folded position.

FIGS. 1-2 show the frame hinge half. The hinge has a straight oval hole for the frame tube to slide into. The frame is stamped to adapt to the straight oval shape at the ends so it fits correctly. By having a straight hole for the frame, the hinge is the same part on both sides of the frame. If the hole was curved to match the initial frame radius, it would require a right and left hand hinge to go on opposite sides. It should be apparent however that the oval shape, while advantageous, does not represent the only non-circular shape for the device. Other shapes that prevent slippage without pins and the like may also be utilized. And, as explained earlier, the two metal frame halves rarely line up perfectly with each other, so stamping the ends straight and oval ensure the ends align consistently. FIGS. 3-6 show a perimeter frame, which is a hoop-like structure when unfolded. Hinge halves are shown both in a compressed or unfolded frame position and in a non-compressed or folded frame position. The interlocking fingers, as shown in FIG. 5, extend up the face of the hinge, which helps stabilize the hinge and inhibit twisting.

Another advantage of the molded hinge explained herein is that bolts and pins are not required to secure the hinge to the metal rail segments. Instead, the hinge unit is made up of two identical molded hinge pieces that each "cap" or overlap the end of the rail segment to which they are connected. Also, each hinge piece interlocks with the other hinge piece with raised tabs or fingers when the rebounder frame is set for use with a jumper in the unfolded position. A metal or plastic pin is only needed as an axis for the hinge pieces to open and close relative to each other; and not for securing the hinge to the frame. Although the hinge need not be bolted or pinned to the frame in the arrangement described, it in no way excludes an arrangement where the molded hinge is bolted, pinned, or otherwise attached to the frame rail. Also, the advantageous arrangement utilizing interlocking ribs or fingers on the hinge parts is not required. In other arrangements, the face of the hinge parts may be substantially flat. Or they may have other shapes beyond the figures shown that achieve a similar result as the ribs or fingers do in the illustrated system.

There is a challenge when the hinge, having a circular cross section, is not bolted to the frame rail. Because there is no bolt, pin, or welding used to secure the hinge unit to the frame, the hinge is able to spin or rotate around the axis of the frame rail. This rotation can result in the hinge spinning such that the pinned portion of the hinge may extend upward or outward. This can create a hazard where a user of the trampoline could inadvertently strike it and although this is not the ideal configuration it nevertheless has some advantages. For example, the pinned portion of the hinge could be twisted to the side to prevent the trampoline from folding It is therefore the presently disclosed system avoids any natural spin or rotation of the hinge unit on frame segments with a round or circular cross section. While rails can be formed with 90 degree edges, it is better to utilize a more circular cross section on the rail, as it produces less friction when used with elastic spring members, such as bungee cords. The lack of spin is achieved by a new rebounder production method that slightly flattens the end of the frame segments to a more oval shape, by coining the rail tube. This production method also slightly straightens out the end segments so that identical hinge halves can be used. Several benefits ensue.

First, by shaping the frame to an oval shape, the hinge and end cap that overlaps the frame, is molded into an oval shape to match the oval shape of the frame. This prevents any spinning or rotation of the hinge on the frame; resulting in a safer and more secure hinge connection. Second, straightening out the frame end segments removes the rail curvature at the end points of the frame rails. If the rails were permitted to retain their natural curve, then two asymmetrical hinge pieces would be necessary. But, by slightly flattening and straightening out the end segments of the frame, only one hinge piece needs to be fabricated. Thus, each hinge is made up of two identical parts in contrast to two asymmetrical and different parts required if the curvature remained. Of course, the use asymmetrical halves that fit the curvature of the rails allow the rail ends reforming step to be skipped.

Having the two identical pieces making up the hinge unit, instead of two asymmetrical pieces eliminates confusion and mistake in assembly for shipment, as the two hinge pieces are identical. The shape of the coined rail need not be oval, but any other shape that may be suitable to prevent spin of the rail. Also, the trampoline rail need not be elliptical in shape, but actually rectangular, or another shape that may be extruded during fabrication. The stamping and coining, as well as the shape of the molded hinge will be necessarily different to adapt to the rail. These various arrangements are all possible with the new system described herein. Even a slight oval shape, for example, maintains the smooth edges advantageous for elastic, bungee type, spring members, while at the same time eliminating hinge spin.

While one shown arrangement uses identical hinge pieces that connect to each other while connecting the frame rails, one may also make two different asymmetrical hinge pieces, while retaining the original curvature of the rail. Keeping the original curvature of the rail will prevent the hinges from rotating without adding the process step of straitening the ends where the hinge pieces attach. Having two different hinge pieces removes the step requiring the stamping or coining of the frame ends to straighten them.

Despite this option, it is beneficial to shape the ends of the frame in any event, in order to ensure that the ends match the molded hinge shape. Otherwise, if the ring is not rolled, or flattened, or made to a slightly different diameter, the hinge pieces will fail to fit, or fit on one segment and not the other. Or the fit could be too loose or too tight.

By stamping the frame rail ends in a controlled manner, a proper fit is better ensured. As it is current practice to stamp the frame end to control its shape for fitting in any event, it is more efficient to straighten the frame end at the same time in the process. This again permits the use of the same molded hinge parts as opposed to two different hinge parts. However, despite the increased difficulty of matching and fitting, a different arrangement can include retaining the original curvature of the rolled metal rail, and therefore utilizing two distinct hinge pieces to connect the rail ends.

Figure 3:
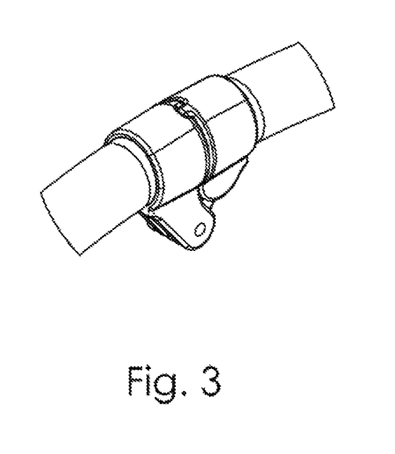
FIG. 3 is a close up view of the frame hinge assembly in the unfolded position.
Figure 4:
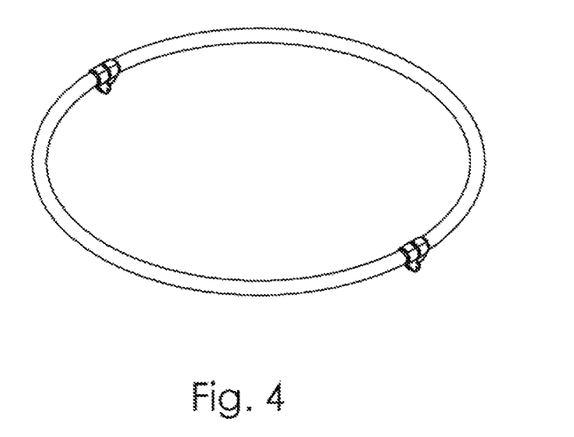
FIG. 4 is an isometric view of the full folding frame assembly in the unfolded position.

Another highly beneficial and newly unique result of the herein described hinge is that, when closed onto itself (so that the rebounder is in the open, unfolded position for use), it permits the two rail piece ends being connected to be much closer to each other. A result of this closeness of the rail ends is that the rail segments are able to press or push into each other at the hinge faces, which are the vertical hinge sides that contact each other when the trampoline is in the open position (and the hinge is therefore closed). FIG. 3 reveals how close such a connection may be achieved with this hinge, such that the hinge halves are able to interlock with each other and exert pressure towards each other; resulting in a stronger connection and improved resistance to stress forces.

The increased compression results in a firmer hold and a stronger rail when in use with a jumper. This compression or pressure between the rail segments at the hinge faces, like the oval shape previously discussed, helps remove any requirement or need for a bolt or pin to secure the hinge to the rails, in either the open or closed position, at the same time, removing the need for a weld. Pins and bolts or welding can be included in other arrangements; but, they are not necessary, as has been the case previously. Welding would be possible, where the hinge unit is made of cast metal or conned to mate with rail ends.

Another significant flaw of prior folding trampolines is the difficulty encountered for a user to merely open or fold the trampoline. It is a little discussed challenge in contrast to how pervasive the problem has been. As distinguished from the system described herein, closing a foldable rebounder frame is a very tricky business, fraught with the risk of the frames snapping together in a fashion akin to a bear trap snapping shut. The system disclosed herein reduces this effect through the new hinge and the use of lower tension elastic spring members.

Another benefit of the system disclosed herein is in the area of commercial use of the rebounder in gyms and exercise or therapeutic facilities. The benefit of using mini-trampolines, or rebounders, in a commercial setting has long been appreciated. Fitness clubs have utilized rebounders for decades, but no manufacturer has designed or produced a rebounder that was foldable in the manner shown here. Such rebounders were not produced for commercial use because of the nature of rebounding, which, during use, create a much greater force on the device than would be placed on a step stool or the like.

This strain is magnified in a commercial setting, where multiple users, with a broad body range of body weight, are using rebounders that they don't personally own. The constant, repetitive jumping action of full sized adult users, especially in a commercial setting as in fitness clubs, can put great strain and force on the frame structure. Such forces unreasonably weaken rebounder frames if they were designed to fold for the commercial environment, thus affecting safety. Therefore, a folding rebounder strong enough for a commercial setting has not been available. It was unexpected when developing the presently disclosed system, until after testing, to learn that the molded hinge was strong enough to survive commercial use. This system possesses the strength and durability to function properly in a commercial environment.

As discussed earlier, a known risk with prior folding rebounders is that they can snap back upon a user, almost like a bear trap, during the process of folding and unfolding. So, while advertised to the general public as convenient folding units for home use, such folding rebounders are anything but easy, or safely convenient for the average user to fold and unfold. The result is that the rebounders are left in the open position far more than is necessary. This defeats the purpose of a folding system, that is, ease of storage between uses.

In addition, the most common rebounders are made with spring based systems. The springs are made of metal, and when added to a steel frame, results in a heavier device than a rebounder utilizing elastic members, such as bungee cords. Due to the high stiffness of the rebounder springs, the closing of a spring based, foldable trampoline is very difficult, so much so that, unless the persons attempting to fold and unfold the rebounder are young adults, and/or strong individuals, or working in concert with others, they are unable to conveniently perform the act of closing and opening the two halves of the trampoline by themselves. For example, some prior rebounders come with instruction manuals that include the requirement that two people must fold and unfold the device. In contrast, the presently described system's advantageous arrangement, utilizing elastic members that are not fixed in a position on the rail, reduces the snap back tension when compared to metal spring based systems, and requires only one user to fold and unfold the device. The hinge described herein functions with elastic members that are allowed to slide around and sideways on the rails as the trampoline is folded and unfolded. This freedom of movement reduces the tension forces significantly and allows for a smoother transition when folding and unfolding, thus improving safe operation for a much wider range of individuals and strength levels.

Another arrangement of the presently described system further includes a hinge lock device (FIGS. 7A-8B). This helps further secure the hinge while the trampoline is in the open position in the event the trampoline is stood on its side by a user. There are a few ways which the latch could lock, depending on how tight the joint will be. One way is to simply squeeze the latch over the plastic bump by deforming the plastic and latch a slight amount. Another way would be to load the latch with a torsional spring so it automatically snaps locked. This is advantageous because it ensures the lock is always used, and there is greater force required to open the lock. A third way is to mount a draw latch onto the hinge. This would provide a large amount of clamping force, but it would add more parts. One more way to lock the hinge would be to have a simple U shaped bar which goes into holes on each hinge half. This would be a simple and strong locking method, but its disadvantage is that it is a loose part when it is unlocked. However, it could be attached to a lanyard or wire cord, so that when unlocked, it remained connected to the unit.

Figure 7A:
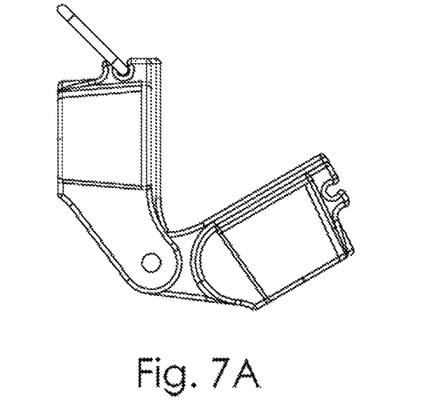
FIG. 7A is a side view of a top locking hinge assembly in the unlocked and opened position.
Figure 7B:
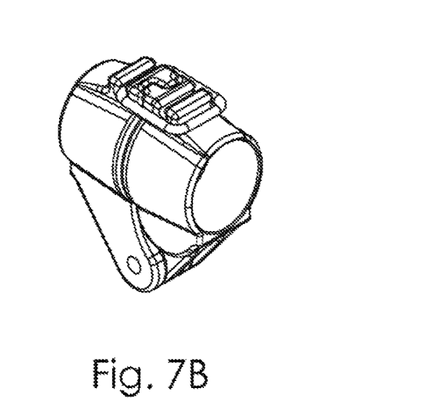
FIG. 7B is an isometric view of a top locking hinge assembly in the locked position.

FIG. 7B is an isometric view of a top locking hinge assembly in the locked position. This hinge has boss extending front the top which provides a pivot point for the latch and a hook for the latch to connect to. Both hinges are the same part, so the latch is installed through the pivot hole on one hinge half, and the latch locks onto the other hinge half. FIG. 10B shows an isometric view of a top locking hinge assembly in the unlocked position. The latch is pulled out of the way, and the hinge is now free to come apart. FIG. 7A is a side view of a top locking hinge assembly in the unlocked and opened position. With the latch out of the way, the hinge can open. From the side, the hook is visible on each hinge where there is a bump which retains the latch in the locked position.

Figure 8A:
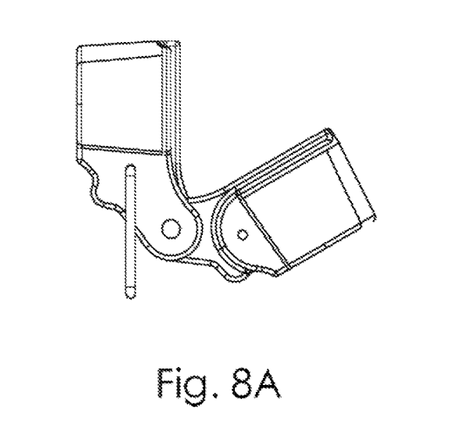
FIG. 8A is a side view of a lower locking hinge in the unlocked and opened position.
Figure 8B:
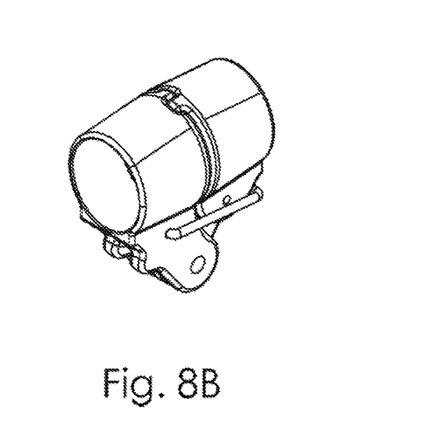
FIG. 8B is an isometric view of a lower locking hinge in the locked position.

FIG. 8BA an isometric view of a lower locking hinge assembly in the locked position. It is similar to the top locking hinge except that the pivot point and hooks are moved under where the frame connects to the hinge. An advantage of this is that the hinge has a smooth top. A disadvantage is decreases the lever arm of the lock, so it must be able to withstand more force than the top locking hinge. FIG. 8A is a side view of a lower locking hinge in the unlocked position. With this hinge, the latch rotates down under the hinge. It can be seen that in this example, the latch is not closed. This provides additional flex in the latch to allow it to bend to get over the hinge bump.

The typical weight of metal spring based rebounders is between 25 to 32 pounds. The total weight of the systems discussed herein is approximately 18 lbs, thus weighing 30% less (at 26 lbs) than the typical spring rebounder; or the typical spring rebounder weighs 44% more than the system described herein. Another advantage beyond the reduced weight is to reduce the previously discussed snap-back force exerted when opening and closing the halves of the rebounder frame. This force is reduced by utilizing elastic cord members, such as bungee cords, in contrast to metal springs which exert a stronger snap-back force on a user attempting to either close or open a folding rebounder or mini trampoline.

Figure 9A:
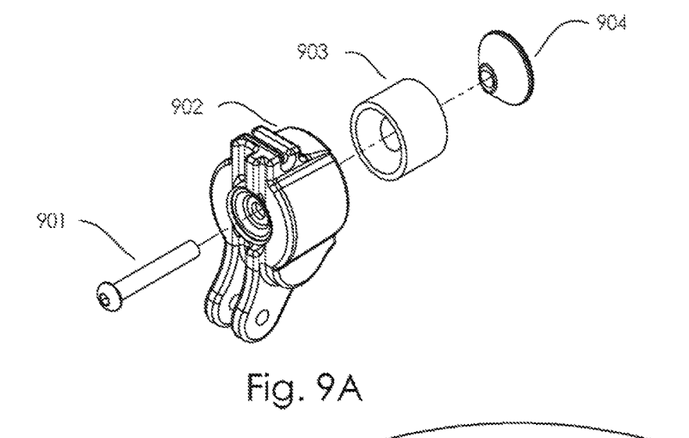
FIG. 9A is an exploded view of an expanding plug frame hinge.
Figures 9B, 9C, 9D:
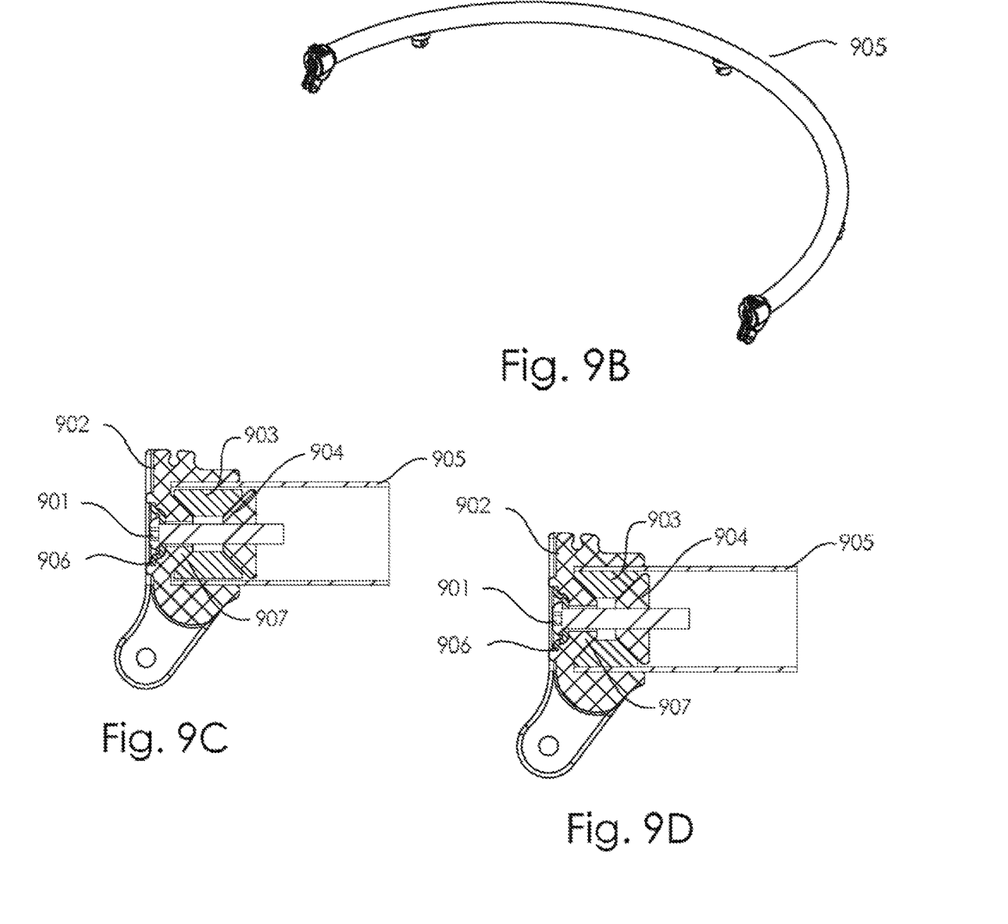
FIG. 9B shows the rebounder frame half with two plug frame hinges attached to the ends of the tube.
FIG. 9C is a cross section view of the expanding plug frame hinge in the loose setting.
FIG. 9D is a cross section view of the expanding plug frame hinge when tightened and deformed against the interior of the rail.

FIG. 9A is an exploded view of a rubber cone frame hinge. The material need not be rubber, but some other compressible material. It is comprised of a screw, or cylindrical rod incised with one or more helical or advancing spiral threads 901, a hinge, 902, a rubber plug, 903, and a threaded cone, 904. FIG. 9B shows the rebounder frame half with the two hinges attached to the ends of the tube, 905. FIG. 9C is a cross section view of the rubber cone frame hinge in the loose setting. The screw, 901, screws into the threaded cone, 904, which draws in and squeezes the rubber plug, 903, against the hinge cone, 907. The screw, 901, is supported with a washer, 906. This washer has a step to spread out the load while keeping the plastic section thick enough. FIG. 9D is a cross section view of the rubber cone frame hinge when tightened. When the rubber plug, 903, is squeezed by the cone, it stretches outwards and exerts pressure against the inside of the frame tube, 905. This pressure creates friction so the hinge cannot be pulled off once tightened, and the rubber and cones support the hinge when it is loaded.

Figure 10A:
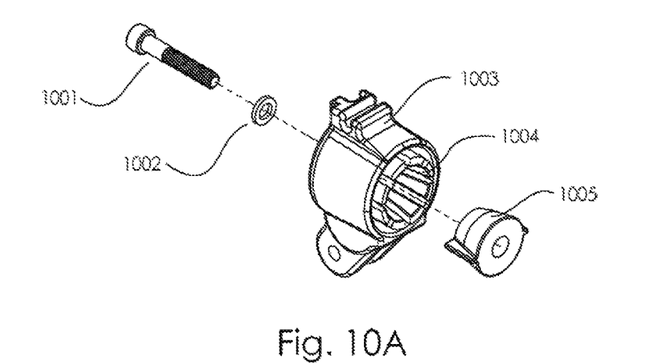
FIG. 10A is an exploded view of a plastic finger collet frame hinge.
Figure 10B:
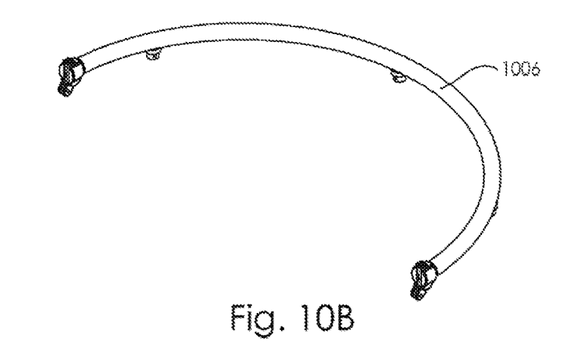
FIG. 10B shows the rebounder frame half with two finger collet hinges attached to the ends of the tube.
Figure 10C:
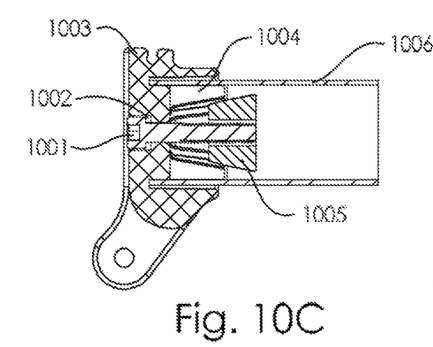
FIG. 10C is a cross section view of the plastic finger collet frame hinge in the loose setting.
Figure 10D:
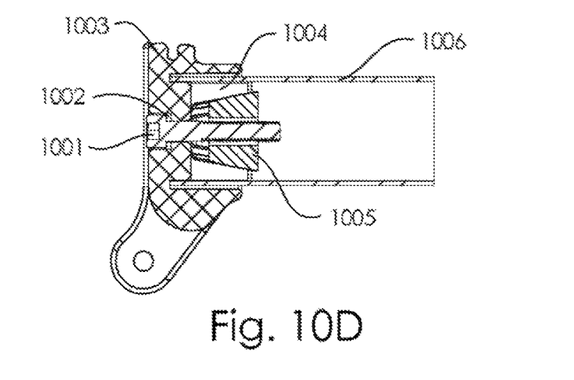
FIG. 10D is a cross section view of the plastic finger collet frame hinge when tightened and deformed against the interior of the rail.

FIG. 10A is an exploded view of a plastic finger collet frame hinge. It is comprised of a screw, 1001, a washer, 1002, a hinge, 1003, and a threaded cone, 1005. 1004 are the flexible fingers which are part of the hinge, 1003. FIG. 10B shows the rebounder frame half with the two hinges attached to the ends of the tube, 1006. FIG. 10C is a cross section view of the plastic finger collet frame hinge in the loose setting. The screw, 1001, screws into the threaded cone which has small protrusions or ridges or fins that line up into the gaps of the finger collet, 1005, which draws in and bends the flexible fingers, 1004. The screw, 1001, is supported with a washer, 1002. FIG. 10D is a cross section view of the plastic finger collet frame hinge when tightened. When the flexible fingers, 1004, are bent by the cones, they run into the inside of the frame and exert pressure against the inside of the frame tube, 1006. This pressure creates friction so the hinge cannot be pulled off once tightened, and the fingers and cone support the hinge when it is loaded.

Figure 11A:
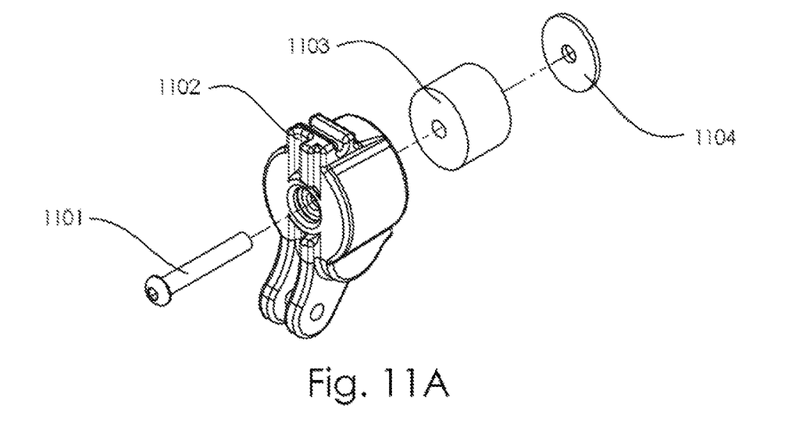
FIG. 11A is an exploded view of a rubber cylinder plug frame hinge.
Figure 11B:
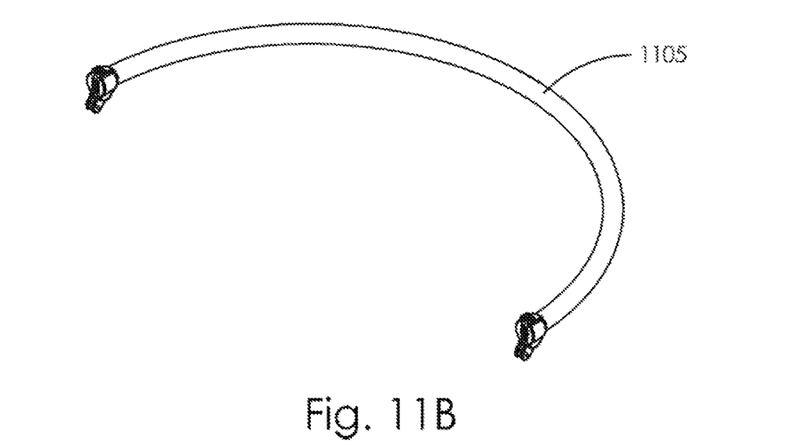
FIG. 11B shows the rebounder frame half with two rubber cylinder plug hinges attached to the ends of the tube.
Figure 11C:
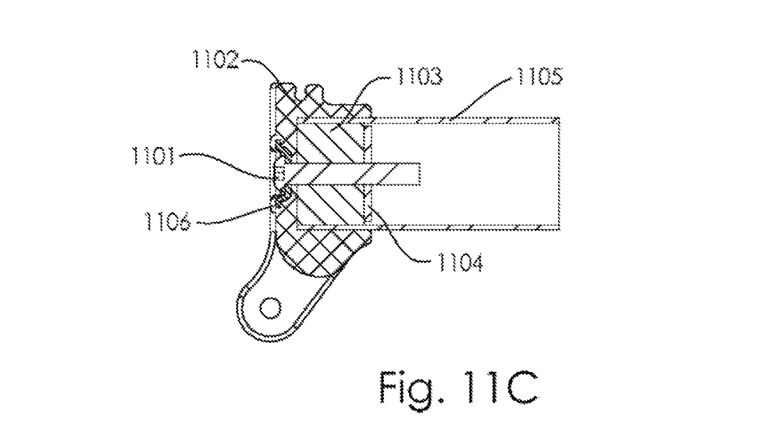
FIG. 11C is a cross section view of the rubber cylinder frame hinge.

FIG. 11A is an exploded view of another rubber cylinder frame hinge utilizing a threaded washer instead of a threaded cone. It is comprised of a screw, 1101, a hinge, 1102, a rubber cylinder, 1103, and a threaded washer, 1104. FIG. 11B shows the rebounder frame half with the two hinges attached to the ends of the tube, 1105. FIG. 11C is a cross section view of the rubber cylinder frame hinge. The screw, 1101, screws into the threaded washer, 1104, which draws in and squeezes the rubber cylinder, 1103, against the hinge face, 1102. The screw, 1101, is supported with a washer, 1106. When the rubber cylinder, 1103, is compressed by the threaded washer, 1104, and the hinge, 1102, it stretches outwards and exerts pressure against the inside of the frame tube, 1105. This pressure creates friction so the hinge cannot be pulled off once tightened, and the rubber supports the hinge when it is loaded.

Figure 12A:
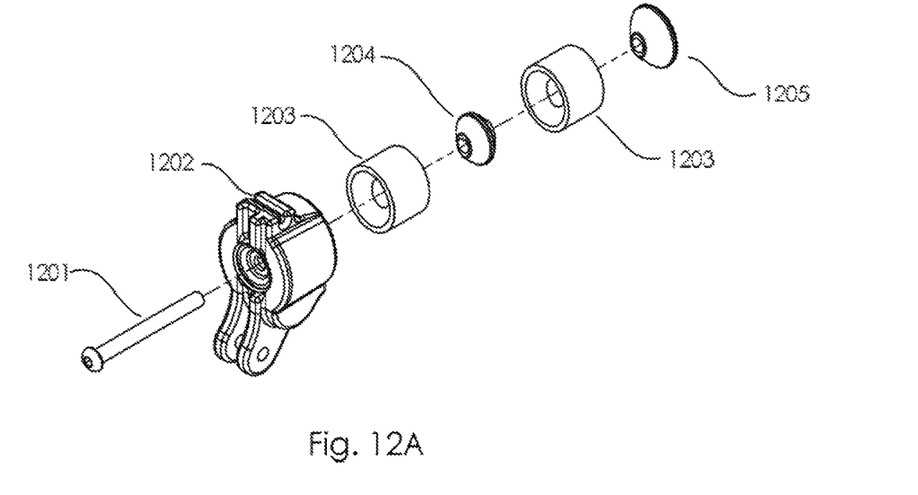
FIG. 12A is an exploded view of a double expanding plug frame hinge.
Figure 12B:
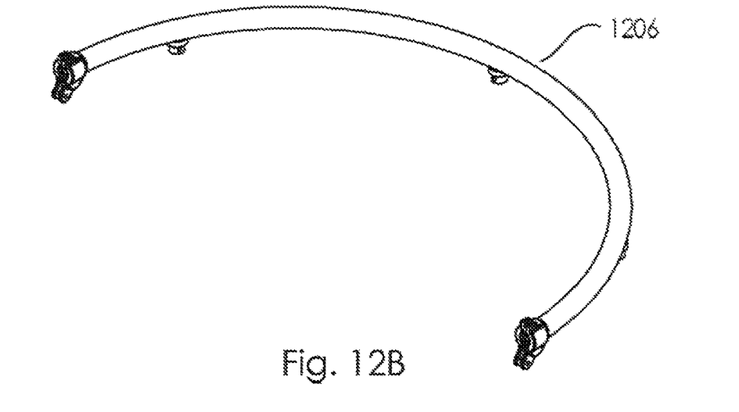
FIG. 12B shows the rebounder frame half with the two hinges attached to the ends of the tube.

FIG. 12A is an exploded view of a double rubber cone frame hinge. It is comprised of a screw, 1201, a hinge, 1202, two rubber plugs, 1203, a double cone, 1204, and a threaded cone, 1205. FIG. 12B shows the rebounder frame half with the two hinges attached to the ends of the tube, 1206.

Figure 12C:
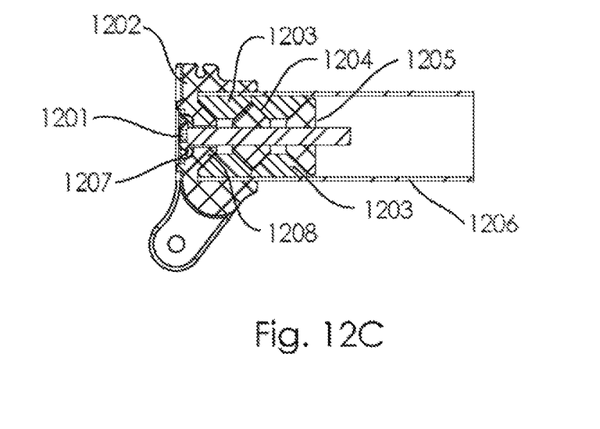
FIG. 12C is a cross section view of the double expanding plug frame hinge when tightened and deformed against the interior of the rail.

FIG. 12C is a cross section view of the double rubber cone frame hinge. The screw, 1201, screws into the threaded cone, 1205, which draws in and squeezes the rubber plug, 1203, against the double cone, 1204, which squeezes the other rubber plug, 1203 against the hinge cone, 1208. The screw, 1201, is supported with a washer, 1207. This washer has a step to spread out the load while keeping the plastic section thick enough. When the rubber plugs, 1203, are squeezed by the cones, they stretch outwards and exert pressure against the inside of the frame tube, 1206. This pressure creates friction so the hinge cannot be pulled off once tightened, and the rubber and cones support the hinge when it is loaded. The difference between this embodiment and FIG. 11 is that this can increase the rubber to tube contact area, and extend it deeper into the tube, 1206. This lowers the stresses on the frame tube, 1206, and it increases stability by increasing the depth to diameter ratio. The reason for two plugs instead of one big plug is because a plug cannot have a high length to diameter ratio itself, otherwise it may buckle rather than compress.

An improved hinge unit is shown in FIGS. 13A-14D. It was found that while a rubber plug shown FIGS. 9 and 11, was superior to the hinge shown in FIG. 1, in its resistance to the forces exerted against it by a weighted jumper, such device could be made even stronger. Such a stronger hinge device was achieved by utilizing a rigid molded material in lieu of rubber. This is described as a rigid split plug, 1305 and 1405. The rigid molded material can be made of various plastics or any other material that is moldable and also rigid enough to not behave in too malleable manner such as rubber can. Even the hardest rubbers are still malleable enough to behave in an almost liquid manner when responding to the forces generated against the hinge. While this may produce a tight seal, it can still "flow" in response to the forces generated by a jumper rebounding on the foldable trampoline. However, the lack of malleability of a rigid molded material created a challenge when assembling the unit and installing it into the hollow frame rail. The rigid plug cannot be easily fabricated as a solid piece in the manner a rubber plug is solid, as show in 1103. FIGS. 13A-14D display how this difficulty was successfully addressed by separating the rigid plug into segments with a hollow center portion capable of receiving a screw, a threaded bolt, or cylindrical rod incised with one or more helical or advancing spiral threads. The rigid split plug is slidably engagable such that it substantially matches the interior dimensions of the hollow portion of the frame rail, but may be slid or inserted into the frame.

Only when the screw or threaded rod, 1301, is tightened, is the rigid split plug deformed against the interior of the rail. Before it is deformed, the rigid split plug may be inserted into the hollow opening of the rail. The rigid plug may be made of plastic or other material, the key being that it does not behave as a liquid (as the rubber plug will) when exposed to deformation and pressure, as well as the forces exerted on the foldable trampoline during use.

Because the rigid plug performed better when divided into two or more portions or segments, it was found that fabrication and production was greatly complicated. It was almost impossible via any process or manual fabrication to perfectly secure divided and separate segments inside the hollow frame without the pieces shifting out of alignment. A solution was developed to address this issue by connecting the rigid segments with breakable tabs 1409 of the same material. These breakable tabs, or thin web sections, serve to maintain the structural integrity of the rigid plug segments so that they may be correctly installed into the frame. The breakable tabs 1409 are comprised of a very small amount of material sufficient to maintain the connection and shape of the rigid split plug segments as a unit. These tabs behave similarly to model sprues used to connect small pieces of toy model parts, so that they may not be lost or scattered until ready for use. When a model builder is ready to connect the small part to a model, these small connection points or tabs are broken. When the screw, 1301, is tightened, the expansion or depression against the interior of the rail tube begins and the rigid spilt plug is deformed against the interior of the rail. It is then perfectly acceptable for these holding tabs to either break, or not break or shear apart, as the plug will no longer shift in a manner sufficient to interfere with its intended function. Additionally, the rigid plastic of the rigid split plug itself may indeed crack or fracture without loss of function once installed. The resulting hinge unit has been found to be several times stronger than any other molded hinge embodiment and stronger than earlier embodiments of the devices shown herein. The great increase in strength has permitted the new hinge to be a satisfactory replacement to the old standard method of welding frame halves together for current foldable trampolines.

Figure 13A:
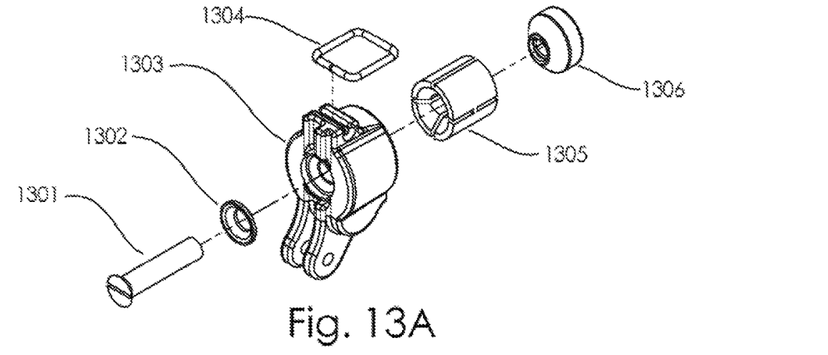
FIG. 13A is an exploded view of a rigid split plug frame hinge.
Figure 13B:
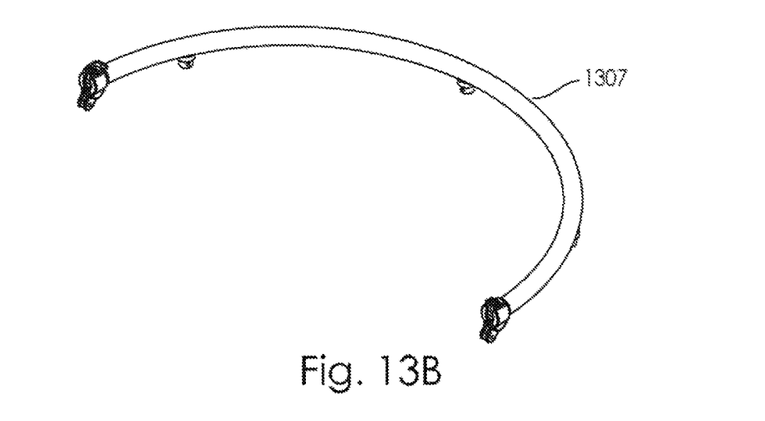
FIG. 13B shows the rebounder frame half with the two hinges attached to the ends of the tube.
Figure 13C:
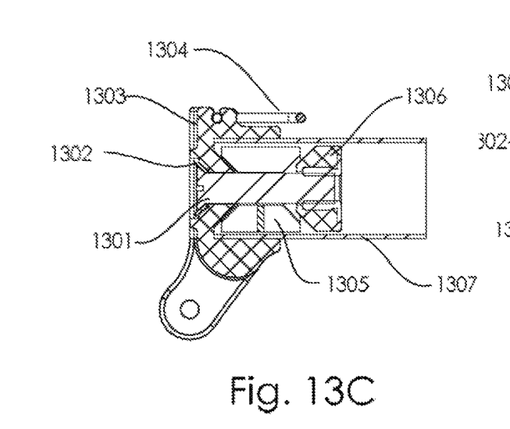
FIG. 13C is a cross section view of the rigid split plug frame hinge in the loose setting.
Figure 13D:
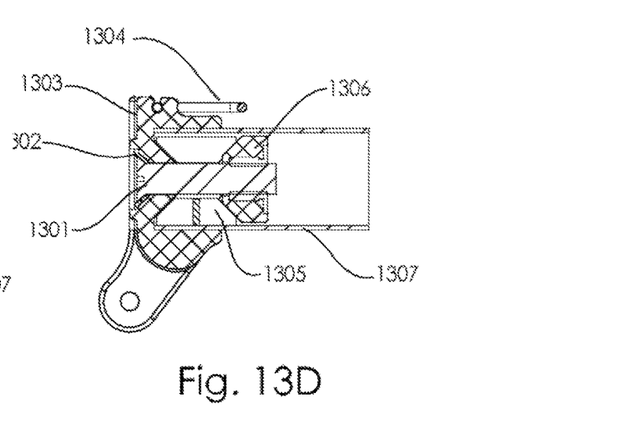
FIG. 13D is a cross section view of the rigid split plug frame hinge when tightened.

FIG. 13A is an exploded view of a rigid split plug frame hinge. It is comprised of a large screw, 1301, a hat washer, 1302, a hinge body, 1303, a hinge lock, 1304, a rigid split plug formed of no less than two segments held together by connecting tabs, 1305, and a threaded cone, 1306. FIG. 13B shows the rebounder frame half with the two hinges attached to the ends of the tube, 1307. FIG. 13C is a cross section view of the rigid split plug frame hinge in the loose setting. The screw, 1301, screws into the threaded cone, 1306, which draws in and squeezes the rigid split plug, 1305, against the hinge, 1303. The screw, 1301, is supported with a washer, 1302. This washer has a step to spread out the load while keeping the plastic section thick enough. FIG. 13D is a cross section view of the rigid split plug frame hinge when tightened. When the rigid split plug, 1305, is squeezed by the cones, it deforms open and exerts pressure against the inside of the frame tube, 1307. This pressure creates friction so the hinge cannot be pulled off once tightened.

Figures 14A, 14B:
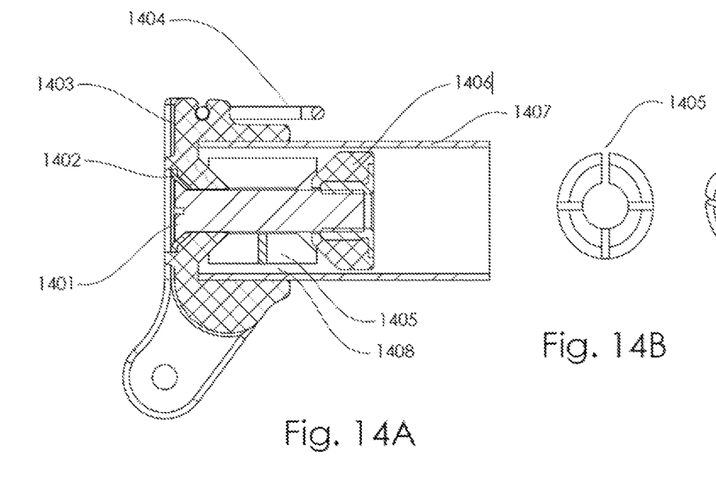
FIG. 14A is an enlarged view of the hinge of FIG. 13C.
FIG. 14B is a front view of the rigid split plug when it is undeformed.
Figure 14C:
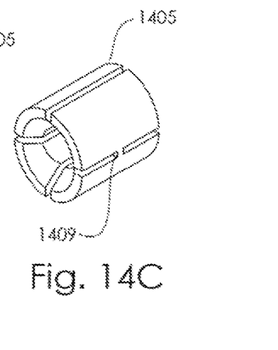
FIG. 14C is an isometric view of the undeformed rigid split plug.

FIG. 14A is an enlarged view of 13C. It shows the gap, 1408, between the rigid split plug segments, 1405, and the inside of the tube, 1407. FIG. 14B is a front view of the rigid split plug when it is undeformed. The top split goes all the way through so the plug (i.e. it has no connecting tab) and is therefore free to open up when it is squeezed. FIG. 14C is an isometric view of the undeformed rigid split plug.

Figures 14D, 14E:
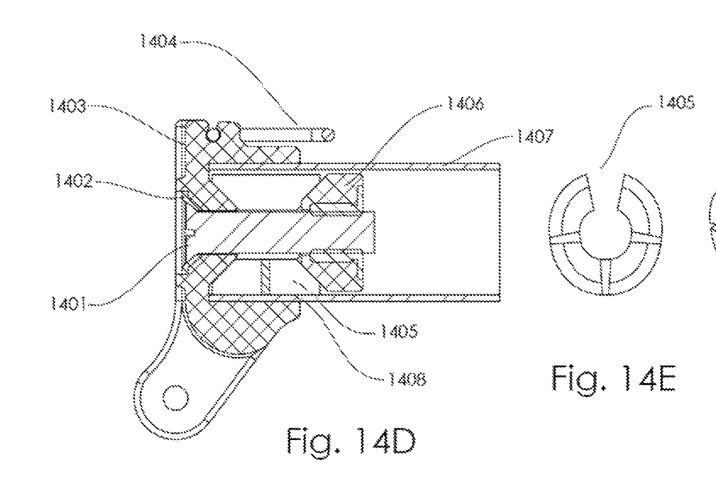
FIG. 14D is an enlarged view of the hinge of FIG. 13D.
FIG. 14E is a front view of the deformed rigid split plug.
Figure 14F:
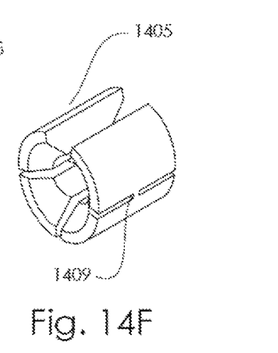
FIG. 14F is an isometric view of the deformed rigid split plug.

FIG. 14D is an enlarged view of 13D. It shows that there is no more gap, 1408, and the rigid split plug, 1405, and the inside of the tube, 1407, are pressed together. This occurs because the nut cone, 1406, is tightened by the screw, 1401, and the rigid split plug, 1405, is forced open and its diameter increases. FIG. 14E is a front view of the deformed rigid split plug. This shows that the plug stretches mostly where the tabs or thin web sections that hold the thick quarters together. FIG. 14F is an isometric view of the deformed rigid split plug.

It should be apparent that many of the parts described in the various embodiments could be made to be interchangeable. For example, the rigid split plug, 1405, may be adapted to replace the plugs shown in FIGS. 9, 11, and 12.

The hinge devices described herein are shown as embodiments for foldable trampolines. However, the shown hinge devices may be used in any application where tubular piping or framing with a hollow interior of a length sufficient to permit the attachment of the described hinge devices, may be anticipated. Flag poles, walking or support canes and walkers, scaffolding, step stools, or other support or framing structures may benefit from use of the hinge devices described herein.

We claim:

1. An exercise system comprising:
    a frame that defines a central opening and that consists of two halves that are rail segments, each half having two frame ends and each frame end having an interior surface that defines a central cavity;
    one or more legs for supporting the frame;
    a jumping surface comprising a mat attached to the frame; and
    two hinges connecting the two frame halves, each hinge comprising two hinge segments that are pivotally joined to one another, wherein the hinge segments each comprise
        a body having an interior surface that defines a cavity that nestingly contains one of the frame ends,
        a deformable plug located within the central cavity of the contained frame end, and
        a tightener operable to expand the plug within the central cavity of the contained frame end such that the plug frictionally engages the interior surface of the central cavity of the contained frame end.

2. The exercise system of claim 1 wherein at least one of the deformable plugs has a surface that is shaped to fit the shape of the interior surface that defines the central cavity within which the plug is contained.

3. The exercise system of claim 1 wherein:
    at least one of the deformable plugs has a surface that is not circular in cross-section; and
    the interior surface that defines the central cavity within which the plug is contained is shaped to mate with the surface of the plug.

4. The exercise system of claim 1 wherein:
    each hinge segment has an end face; and
    the two end faces of each hinge engage each other when the frame is unfolded.

5. The exercise system of claim 4 wherein each tightener is inset in one of the bodies such that when the frame is unfolded, the tighteners do not prevent the two end faces of each hinge from coming into contact.

6. The exercise system of claim 1 wherein each hinge segment has an end face and is configured so that when the frame is unfolded, the end faces of each hinge are pressed against each other.

7. The exercise system of claim 1 wherein the hinge segments are connected to each other outside the plane of the unfolded rail segments, such that each hinge segment connects to the end of a rail segment by capping or overlapping the rail segment on one end, and having a face or contact surface on the opposite end of the hinge part, such that when the frame is in the open position, the face of each hinge part closes in and contacts with the other.

8. The exercise system of claim 1 wherein each hinge face contains ridges or fingers that interlock when the two hinge faces are in contact with each other, such that slippage between the two hinge faces is inhibited.

9. The exercise system of claim 1 wherein:
the body has a cavity defined by an interior surface with a cross-section that is not circular; and
the frame end contained in the cavity of the body has an outer surface that is shaped to interlockingly engage the interior surface of the body.

10. The exercise system of claim 9 wherein:
the interior surface that defines the cavity of the body has a cross-section that is non-circular; and
the frame end contained in the cavity of the body has an outer surface that is shaped to interlockingly engage the interior surface of the body.

11. The exercise system of claim 1 wherein the hinge is lockable such that the frame may not be folded.

12. The exercise system of claim 1 wherein:
each hinge segment comprises a bore; and
the tightener further comprises a screw that has a cylindrical shaft that extends through the bore and that has a head at one end, the head having a greater axial dimension than the shaft, and a threaded conical nut, the shaft being located such that rotation of the screw causes the threaded cone to move axially so as to squeeze the deformable plug so that it expands against the inside of the contained frame end creating friction such that the hinge frictionally engages the contained frame end.

13. An exercise system comprising:
a foldable perimeter frame that defines a central opening when the frame is unfolded and that comprises at least two elongated frame members, wherein an end of each of the two elongated frame members is tubular, has an outer surface, and has an inner surface defining a central cavity and wherein the ends are located in proximity, the frame being movable between an unfolded position wherein the entire perimeter frame generally lies in a plane and a folded position wherein the at least two elongated frame members lie alongside one another;
one or more legs attached to the perimeter frame for supporting the perimeter frame above the ground when the frame is unfolded;
a mat supported within the central opening when the frame is unfolded; and
a hinge comprising two hinge members that are pivotally joined to one another and that respectively are connected to the ends of the two elongated frame members that are located in proximity,
wherein at least one of the hinge members comprises
a body having an interior surface that defines a cavity that nestingly contains one of the ends of the two elongated frame members,
a deformable plug located within the central cavity of the one of the ends of the two elongated frame members, and
a tightener operable to maintain the plug in frictional engagement with the interior surface that defines the central cavity.

14. The exercise system of claim 13 wherein both the outer surface and inner surface have oval cross-sections.

15. The exercise system of claim 13 wherein at least one hinge member comprises a cylindrical rod incised with one or more helical or advancing spiral threads, a hat washer, a rigid split plug, and a threaded cone, arranged such that when the cylindrical rod is rotated, the threaded cone moves axially so as to squeeze the split plug such that it expands against the inside of the frame tube creating friction such that the hinge is frictionally connected to the frame tube.

16. The exercise system of claim 15 wherein the rigid split plug is comprised of no less than two portions connected to each other by no less than one tab of material that is breakable when the rigid split plug is deformed against the interior of the hollow portion of the frame tube.

17. The exercise system of claim 15 wherein the rigid split plug portions are adapted to fracture when the rigid split plug is deformed against the interior of the hollow portion of the frame tube.

18. The exercise system of claim 13 wherein at least one hinge member comprises:
a cylindrical rod incised with one or more helical or advancing spiral threads;
a compressible plug; and
a threaded cone.

19. The exercise system of claim 13 wherein at least one hinge member comprises:
a screw;
a washer;
a finger collet hinge; and
a threaded cone with protrusions able to fit within the finger collet, such that when the screw is rotated, the collet expands and depresses against the inside of the hinge and against the threaded cone.

20. The exercise system of claim 13 wherein at least one hinge member comprises:
a screw;
a compressible plug; and
a threaded washer.

21. The exercise system of claim 13 wherein at least one hinge member comprises:
a cylindrical rod incised with one or more helical or advancing spiral threads;
a threaded step washer, and a compressible plug adjacent to a threaded cone adjacent to a second plug which is adjacent to a second threaded cone, such that, when the cylindrical rod is rotated, the plugs and cones are drawn in against each other and deformed so that the plugs exert pressure against the interior of the frame tube.

22. The exercise system of claim 13 wherein the hinge is lockable to secure the frame such that the frame may not be folded.

* * * * *